(12) United States Patent
Hansen et al.

(10) Patent No.: US 9,676,113 B2
(45) Date of Patent: Jun. 13, 2017

(54) METHOD AND DEVICE FOR PRODUCING AN ENERGY-ABSORBING PROFILE FOR A MOTOR VEHICLE

(71) Applicant: Benteler Automobiltechnik GmbH, Paderborn (DE)

(72) Inventors: Kathy Hansen, Tonder (NO); Edwin List Clausen, Lojt Kirkeby Abenra (NO); Borge Holm, Bredebro (DK); Sigmund Roe, Gjovik (NO)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 325 days.

(21) Appl. No.: 14/243,415

(22) Filed: Apr. 2, 2014

(65) Prior Publication Data

US 2014/0311308 A1    Oct. 23, 2014

(30) Foreign Application Priority Data

Apr. 4, 2013    (DE) .......................... 10 2013 103 366

(51) Int. Cl.

| | |
|---|---|
| *B26D 3/00* | (2006.01) |
| *B26D 1/04* | (2006.01) |
| *B21D 28/24* | (2006.01) |
| *B21D 28/28* | (2006.01) |
| *B21D 53/88* | (2006.01) |
| *B60R 19/34* | (2006.01) |

(52) U.S. Cl.
CPC .............. *B26D 1/04* (2013.01); *B21D 28/243* (2013.01); *B21D 28/28* (2013.01); *B21D 53/88* (2013.01); *B60R 19/34* (2013.01); *Y10T 83/0596* (2015.04); *Y10T 83/384* (2015.04)

(58) Field of Classification Search
CPC ...... B21D 28/28; B21D 28/243; B21D 53/88; Y10T 83/0596; Y10T 83/384; B60R 19/34
USPC .............................................. 83/54, 178, 184
See application file for complete search history.

(56) References Cited

U.S. PATENT DOCUMENTS

| | | | | |
|---|---|---|---|---|
| 3,259,003 | A * | 7/1966 | Griffin | ................... B21D 28/28 29/557 |
| 5,896,773 | A | 4/1999 | Lee | |
| 6,418,822 | B1 * | 7/2002 | Case | ..................... B26D 3/163 82/113 |
| 6,964,096 | B2 | 11/2005 | Tryland | |
| 8,201,861 | B2 | 6/2012 | Handing et al. | |
| 8,702,149 | B2 | 4/2014 | Arzoumanian et al. | |
| 9,308,664 | B2 * | 4/2016 | Kalbacher | ............. B26F 1/0015 |

(Continued)

FOREIGN PATENT DOCUMENTS

| | | |
|---|---|---|
| DE | 195 17 918 A1 | 11/1996 |
| DE | 196 03 953 | 4/1997 |

(Continued)

*Primary Examiner* — Omar Flores Sanchez
(74) *Attorney, Agent, or Firm* — Henry M. Feiereisen LLC

(57) ABSTRACT

A method for producing an energy-absorbing profile for a motor vehicle includes: providing an extruded hollow profile, the extruded hollow profile having outer walls and at least one inner wall which connects two of the outer walls; inserting a cutting tool into the hollow profile; actuating the cutting tool and cutting an inner wall section out of the inner wall; and removing the cut out wall section and the cutting tool from the hollow profile.

13 Claims, 5 Drawing Sheets

(56) References Cited

U.S. PATENT DOCUMENTS

2002/0158384 A1    10/2002   Beck
2011/0109122 A1    5/2011   Clausen et al.
2012/0119526 A1    5/2012   Clausen et al.
2013/0154300 A1    6/2013   Arzoumanian et al.

FOREIGN PATENT DOCUMENTS

| DE | 101 29 055 A1 | 1/2002 |
| DE | 103 01 464 A1 | 7/2003 |
| DE | 102 34 253 | 4/2004 |
| DE | 60 2005 004 442 T2 | 1/2009 |
| DE | 102008029634 | 8/2009 |
| DE | 10 2009 053 861 A1 | 5/2011 |
| DE | 102011107698 | 1/2013 |
| DE | 10 2011 119 092 A1 | 5/2013 |
| DE | 10 2013 201 437 A1 | 7/2014 |
| EP | 0 672 479 | 9/1995 |
| GR | 1003476 | 12/2000 |
| IL | 109042 | 4/1997 |
| JP | S52-78746 | 7/1977 |
| JP | S59-178135 | 10/1984 |

* cited by examiner

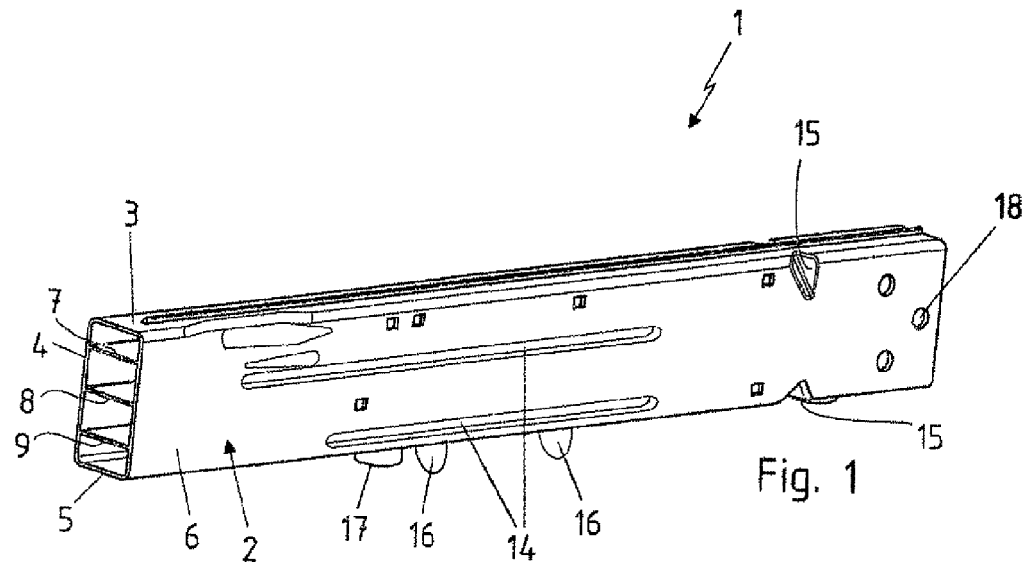
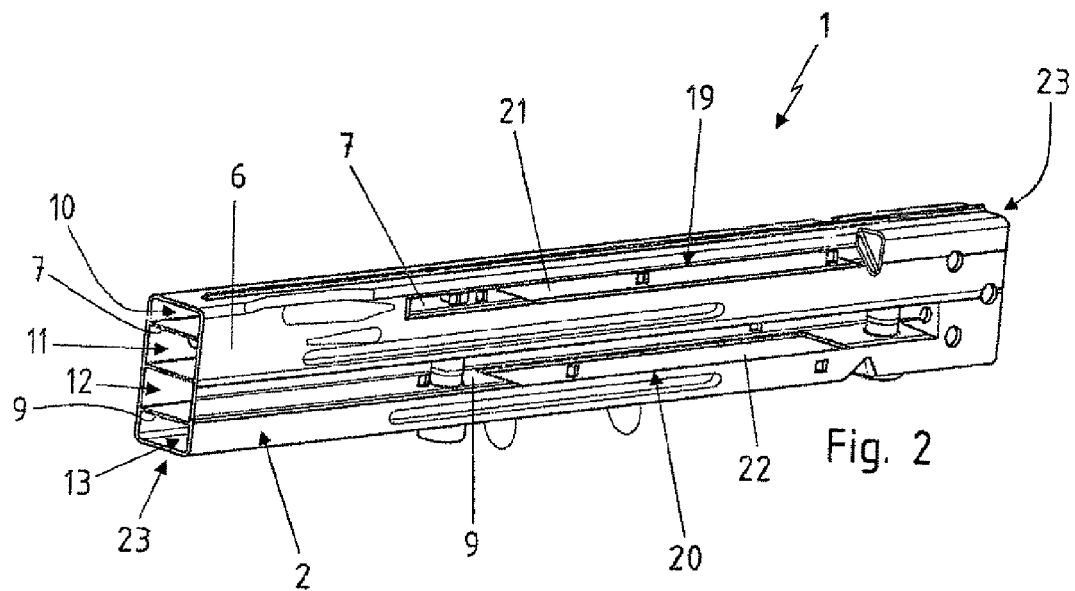

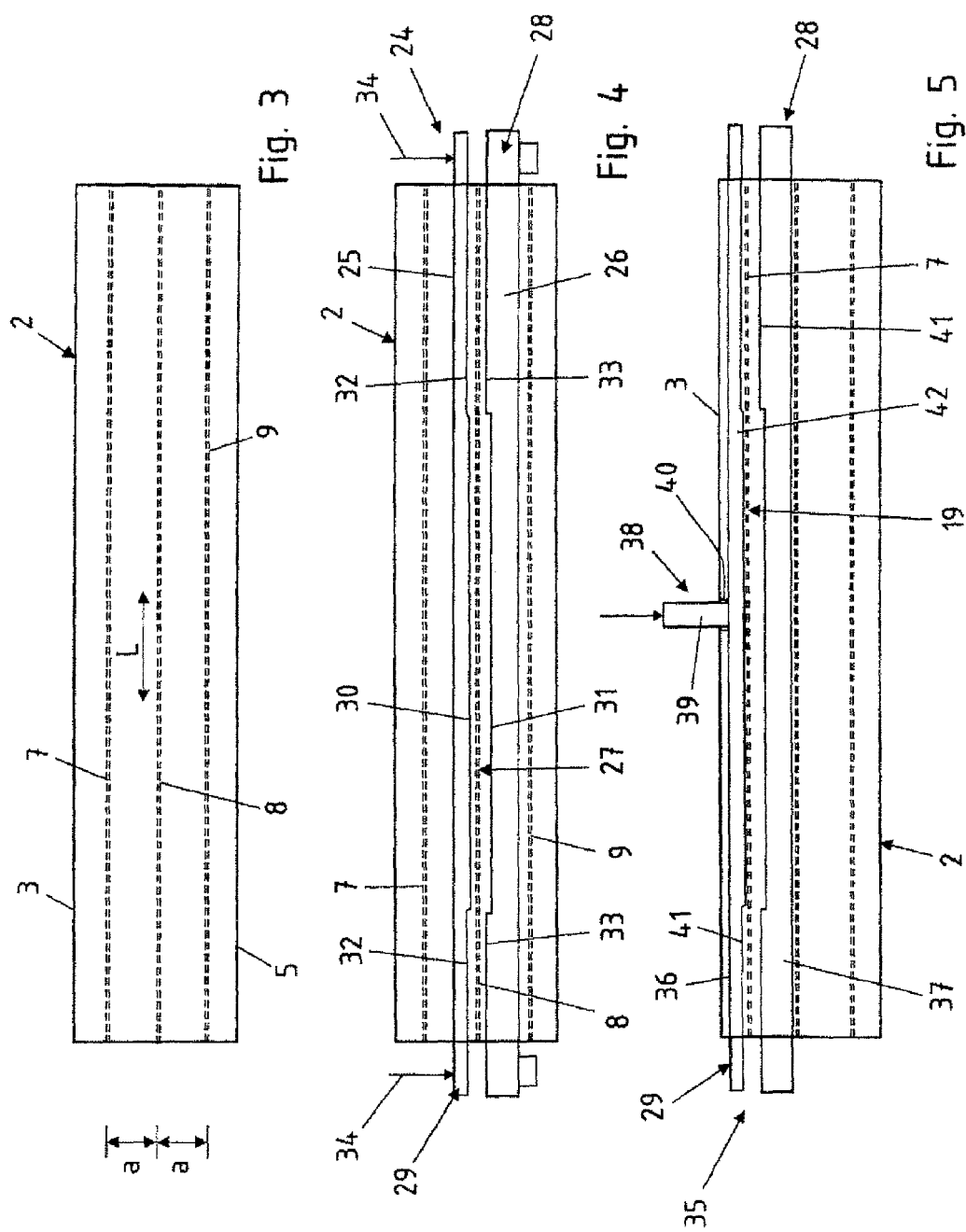

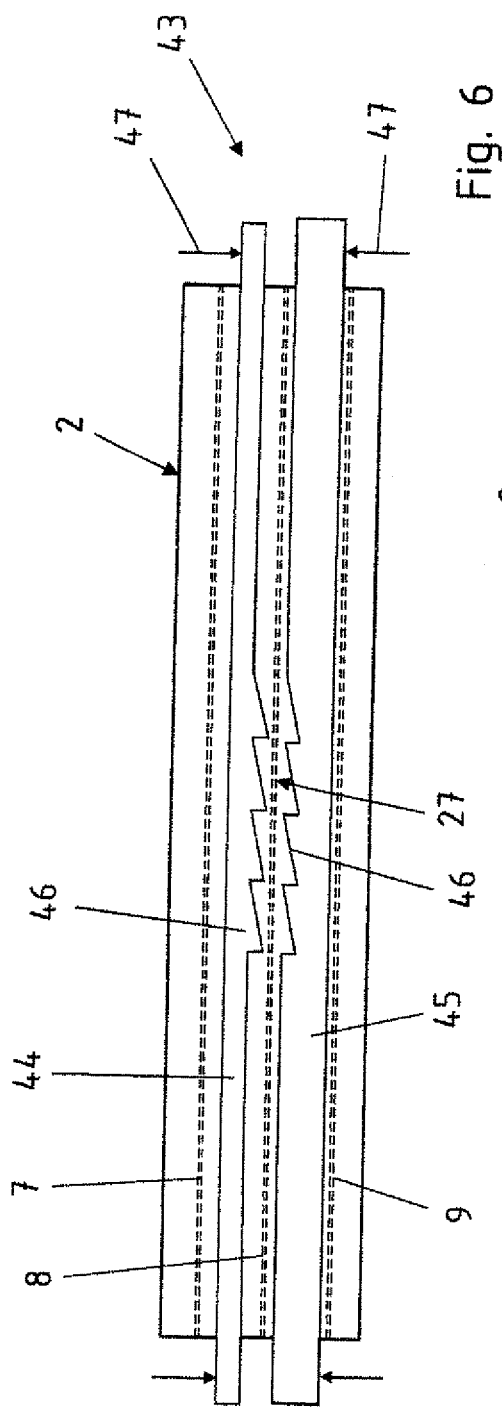
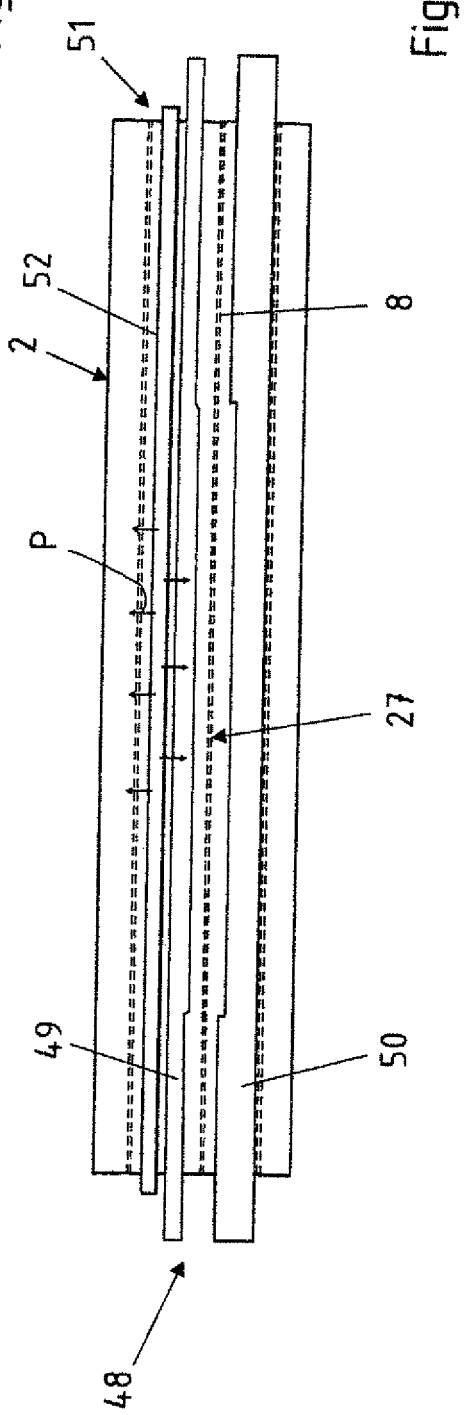

METHOD AND DEVICE FOR PRODUCING AN ENERGY-ABSORBING PROFILE FOR A MOTOR VEHICLE

CROSS-REFERENCES TO RELATED APPLICATIONS

This application claims the priority of German Patent Application, Serial No. 10 2013 103 366.0, filed Apr. 4, 2013, pursuant to 35 U.S.C. 119(a)-(d).

BACKGROUND OF THE INVENTION

The invention relates to a method and a device for producing an energy-absorbing profile for a motor vehicle. Such an energy-absorbing profile includes an extruded hollow profile with outer walls and at least one inner wall, which connects two outer walls. In case of an accident, the energy-absorbing profile absorbs energy by deformation within the profile.

Parts of vehicle structures that are configured as deformation zones serve for the passive protection of vehicle occupants as well as for protection of the supporting structure of the motor vehicle. The goal is to absorb energy resulting from an impact and convert it into deformation energy in the energy-absorbing profile. This is intended to reduce the forces acting on vehicle occupants and pedestrians involved in the accident and also to prevent exceeding critical load levels at which support structures of the motor vehicle may suffer permanent damage.

Energy-absorbing profiles can be configured for example as crash boxes, which in combination with the bumper cross member adsorb the collision forces in case of an impact at low speed without causing damage to the remaining portions of the vehicle body structure. A crash box formed from extruded profiles, which are nested within each other, is state of the art through DE 10 2011 107 698 A1.

A crash box for motor vehicles for absorbing energy in case of a collision of the motor vehicle with an obstacle is also described in US 2002/0158 384 A1. The crash box has a hollow cylindrical body, which is made of metal and defines a longitudinal direction of the bumper, and has deformation embossments in the sheath. The deformation embossments serve for achieving a defined compression of the hollow body when impinged with a force in longitudinal direction.

DE 102 34 253 B3 discloses a method for producing a crash box for motor vehicles from a semi-finished sheet metal and a crash box for motor vehicles with a multi-chamber profile. For producing the crash box the semi-finished sheet metal is formed into a multi-chamber profile, in particular a double-chamber profile, by bending or folding.

Cross members or longitudinal members can also be configured as energy-absorbing profile. This applies in particular to cross members and longitudinal members, which are exposed to an axial load in case of a collision.

From a manufacturing point of view as wells as due to the energy-absorbing capacity and for reasons of weight reduction, energy-absorbing profiles made of extruded hollow profiles made from light metal materials are used. In this context, a bumper with energy-absorbing profiles arranged thereon in the form of deformation elements is state of the art through DE 10 2008 029 634 A1. The deformation elements are rectangular hollow profiles with one or multiple chambers. A multi-chamber profile is formed by inner walls, which are arranged between two outer walls and connect the outer walls.

The bumper for motor vehicles described in DE 196 03 053 C1 has a first extruded hollow profile part whose profile extends transverse to the longitudinal axis of the bumper. For increasing the buckling stiffness of the bumper, the first extruded hollow profile is form fittingly surrounded by a sleeve-shaped second hollow profile part, wherein the open ends of the hollow profile part are supported on one side on a flange part of the bumper and on the other side on the cross member of the motor vehicle.

The advantages of the extruded profiles include the possibility to be able to also produce complicated shapes of hollow profiles. However, the cross-sectional geometry and the outer and inner shape of the extruded strand is defined by the pressing tool and manufacturing is the same over the entire length of the hollow profile.

In energy-absorbing profiles for motor vehicles made of extruded hollow profiles, the inner walls between two outer walls serve in particular for providing the profile with stability and to contribute to energy-absorption. In this regard it is desirable to configure the deformation properties of the energy-absorbing profile specific for the particular component in order to influence the deformation property and with this the energy-absorbing capacity.

SUMMARY OF THE INVENTION

In light of the state of the art, the invention is therefore based on the object to create a method and a device for producing an energy-absorbing profile for a motor vehicle, which has improved deformation properties.

The part of the object relating to the method is solved by a method for producing an energy-absorbing profile for a motor vehicle including providing an extruded hollow profile, said extruded hollow profile having outer walls and at least one inner wall which connects two of the outer walls; inserting a cutting tool into the hollow profile; actuating the cutting tool and cutting an inner wall section out of the inner wall; and removing the cut out wall section and the cutting tool from the hollow profile.

A device for carrying out the method according to the invention includes a cutting tool which extends through a length of the hollow profile, said cutting tool having blades, said blades being arranged so as to enable cuffing out an inner wall section of the inner wall of the hollow profile by actuation of the cutting tool.

A device for producing an energy-absorbing profile includes an extruded hollow profile with outer walls and at least one inner wall which connects two of the outer walls, with the inner wall being removed in an inner wall section at least in regions, includes a cutting tool which extends through a length of the hollow profile, wherein the cutting tool has blades which are arranged so as to effect cutting out an inner wall section of the inner wall of the hollow profile by actuation of the cutting tool.

The energy-absorbing profile for motor vehicles produced according to the invention can in particular be a crash box, a cross member or a longitudinal member or cross member components or longitudinal member components. These are in particular profiles, which in case of a crash are exposed to load in axial direction and convert impact energy into deformation work by deformation or the formation of folds. The absorption profile includes an extruded hollow profile with outer walls and at least one inner wall, which extends between two outer walls and connects the outer walls. The inner wall is locally removed for adjusting the deformation properties and the energy-absorbing capacity. For this, an inner wall section is cut out in regions of the inner wall. The inner wall extends in longitudinal direction over the length of the extruded hollow profile and has in the interior at least one recessed region, in which the wall section is removed. The removed region or section of the inner wall is situated between two remaining wall sections. The removed wall section or sections form recesses in the inner wall.

In the respective end sections of the hollow profile, the inner wall extends up to the end sides of the hollow profile.

The removed wall sections can preferably be completely removed between the outer walls. This aspect provides that the inner wall is cut out flush along the inner surface of the outer walls. It is also possible that the inner wall is regionally removed so that lateral webs remain on the outer walls.

An aspect of the invention provides that 20% to 80% of the inner wall are removed. Herby, multiple inner wall sections can be removed in a targeted manner. There is thus a sequence of recessed regions in the inner wall.

In case of a multi-chamber profile with two or more inner walls in which consequently at least two spaced apart inner walls are provided, removed wall sections can be provided in both inner walls. The wall sections or the removed regions can be arranged in correspondence to one another. This means that the removed wall sections or the recesses formed thereby in the inner walls are arranged above or adjacent one another so as to be aligned with one another. It is also possible that the removed wall sections and the recessed regions formed thereby are arranged offset to each other.

The hollow profile of the energy-absorbing profile is extruded and is made of light metal or a light metal alloy, in particular an aluminum alloy. Particularly preferably, the wall sections are cut out of the inner wall.

A method for producing an energy-absorbing profile for a motor vehicle includes the following steps:

providing an extruded hollow profile, which has outer walls and a inner wall, which connects two outer walls;

inserting a cutting tool into the hollow profile;

actuating the cutting tool and separating an inner wall section from the inner wall;

removing the cut out wall section and the cutting tool from the hollow profile.

The cutting tool in general, in particular the active cutting components or separating components such as blades of the cutting tool, are actuated by drive means. The drive means can be electrical, mechanical, hydraulic, pneumatic drive means or combinations of the aforementioned drive means.

The separation process can be effected by a movement of the cutting tool or of parts of the cutting tool. Also, cutting or separating components of the cutting tool can be moved. The movement of the cutting tool or the cutting tool parts can occur by a press with a linear drive or an eccentric drive. The separation movement of cutting components or separating components of the cutting tool can be carried out mechanically for example by converting a linear movement into a radial movement of the cutting components or separating components via a slanted plane. The cutting tool or the cutting tool parts can also be moved hydraulically or pneumatically by means of hydraulic or pneumatic drives, cylinders or expansion bodies in order to effect the separation process. During the separation, adjacent regions of the wall section of the inner wall to be removed are supported.

Because the hollow profiles have a greater length compared to their height and width, correspondingly long cutting tools and thin cutting tools, which are adapted to the cross section in a multi-chamber profile or the individual chambers of the multi-chamber profile are used.

A cutting tool has a first cutting tool part and a second cutting tool part. The first cutting tool part and the second cutting tool part are inserted into the hollow profile from an end side of the hollow profile. Hereby, the cutting tools can be inserted into the hollow profiles from the same end side in the same direction or from opposing end sides of the hollow profile in different directions. The first cutting tool is inserted into a first chamber of the hollow profile on a first side of the inner wall, whereas the second cutting tool is inserted into a second chamber of the hollow profile on the second side of the inner wall, which opposes the first side. The cutting tools are brought in position and an inner wall section is cut out at a precise position.

Multiple wall sections can be cut out from the inner wall simultaneously in one separation process. It is also possible to offset the cutting tool in longitudinal direction of the hollow profile in order to separate different wall sections from the inner wall sequentially one after the other.

The cutting tool can be actuated by drive means, which act from outside the hollow profile. It is also possible that the cutting tool is actuated by drive means, which are located in the hollow profile. Combinations of outer and inner drive means are also possible.

The device for producing an energy-absorbing profile includes a cutting tool, which extends over the length of the hollow profile and has blades. The term blades means the cutting or separating components that are active during the separation process including required counter holders or male dies or female dies. The cutting tool also has support zones. By way of the blades, inner wall sections of the hollow profile are cut out. The support zones serve for supporting adjacent regions of the wall section or the inner wall during the separation process. The cutting tool has blades, which are arranged so that at least one inner wall section of the inner wall of the hollow profile is cut out by actuating the cutting tool.

As described above, for producing the energy-absorbing profile the cutting tool of the device can be actuated by drive means, which act upon the cutting tool or on the cutting tool from inside and/or outside the hollow profile.

A cutting tool includes two cutting tool parts, which extend over the length of the hollow profile. Hereby, the cutting tool parts can be inserted into the hollow profile by being guided in the same direction, i.e., in one direction from an end side as wells as in opposite directions from respectively opposing end sides.

An advantageous embodiment of the device according to the invention provides for an outer support unit, which receives the hollow profile during the cutting or separating process. This allows absorbing or transmitting cutting forces. An outer deformation of the hollow profile is prevented by the support unit. This is particularly advantageous in the case of thin-walled hollow profiles.

BRIEF DESCRIPTION OF THE DRAWING

In the following, the invention is described by way of drawings. It is shown in:

FIG. 1 an energy-absorbing profile in a perspective view;

FIG. 2 the energy-absorbing profile according to FIG. 12 with view into the inner space;

FIG. 3 a schematic side view of a representation of the starting profile of an energy-absorbing profile;

FIG. 4 the hollow profile of an energy-absorbing profile together with a first cutting tool;

FIG. 5 the hollow profile of an energy-absorbing profile together with a second embodiment of a cutting tool.

FIG. 6 the hollow profile of an energy-absorbing profile together with a further embodiment of a cutting tool;

FIG. 7 the hollow profile of an energy-absorbing profile together with a further embodiment of a cutting tool;

DETAILED DESCRIPTION OF PREFERRED EMBODIMENTS

Figure 8:
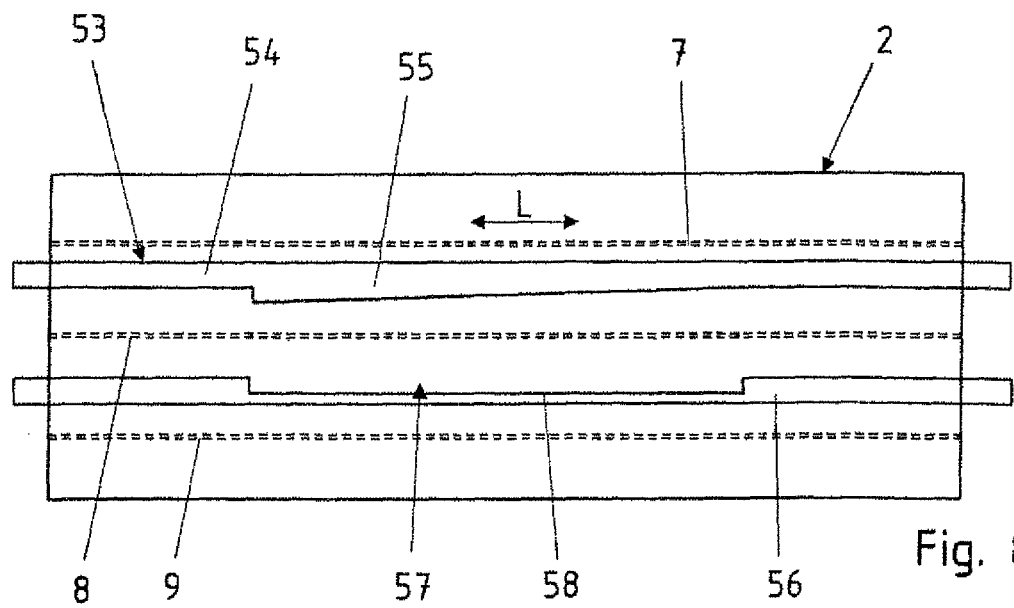
FIG. 8 the hollow profile of an energy-absorbing profile together with a further embodiment of a cutting tool.

FIGS. 1 and 2 show an energy-absorbing profile 1 produced according to the invention. The energy-absorbing profile 1 has an extruded hollow profile 2 made of light metal or a light metal alloy. The hollow profile 2 has a circumferentially closed rectangular cross section, which has four outer walls 3, 4, 5, 6. In the here shown exemplary embodiment, three inner walls 7, 8, 9 extend between the two lateral outer walls 4, 6. The inner walls 7, 8, 9 connect the lateral outer walls 4, 6 and divide the hollow profile 2 into a total of four chambers 10, 11, 12, 13 (see also FIG. 3). The inner walls 7, 8, 9 extend in longitudinal direction L of the hollow profile 2. The inner walls 7, 8, 9 are arranged above each other at a distance a. The distance a between the inner walls 7, 8, 9 can vary. In the outer walls 3, 4, 5, 6 longitudinal embossments 14 and transverse embossments 15 are provided. In addition, holders 16, mounting elements 17 and mounting openings 18 are provided in the hollow profile of the energy-absorbing profile 1.

FIG. 2 provides insight into the internal space of the hollow profile 2. For this, the lateral outer wall 6 is shown partially opened. It can be seen that the inner walls 7 and 9 are removed in an inner wall section 19, 20. As a result recesses 21, 22 are formed in the inner walls 7, 9. The recessed or removed wall sections 19, 20 are situated in the center longitudinal region of the hollow profile 2. The inner walls 7, 9 extend respectively on the right hand and left hand side of the removed wall sections 19, 20 up to the end sides 23 of the hollow profile 2 which are located on the left hand and right hand side in the image plane.

In the here shown exemplary embodiment, the removed wall section 19 is located in the inner wall 7 or the recess 21 and the removed wall section 20 in the inner wall 9 or the recess 22 so as to be aligned with each other.

The recesses 21, 22 in the inner walls 7, 8, 9 formed by the removed wall sections 19, 20 can also be arranged offset to each other. The recesses 21, 22 in the inner walls 7, 8, 9 can also vary from each other regarding their size and configuration.

By removing the inner wall sections 19, 20 in the inner walls 7, 9 the stiffness properties and in particular the deformation properties and with the energy-absorbing capacity of the energy-absorbing profile 1 can be adjusted. In particular the appropriate choice of the removed wall sections 19, 20 and their geometry allows influencing the deformation properties and the fold formation characteristic in the case of exposure to load and exceedance of a defined load level. In this context the removed wall sections 19, 20 can be removed flush relative to the inner surface of the outer walls 4, 6. Also, webs can remain along the outer walls 4, 6 in order to define the deformation properties.

FIGS. 3 to 9 show different embodiments of the cutting tools of a device for producing an energy-absorbing profile 1 according to the invention, each in a schematic side view. For reasons of clarity the cutting tool is shown in FIGS. 3 to 9 in open position.

Figure 10:
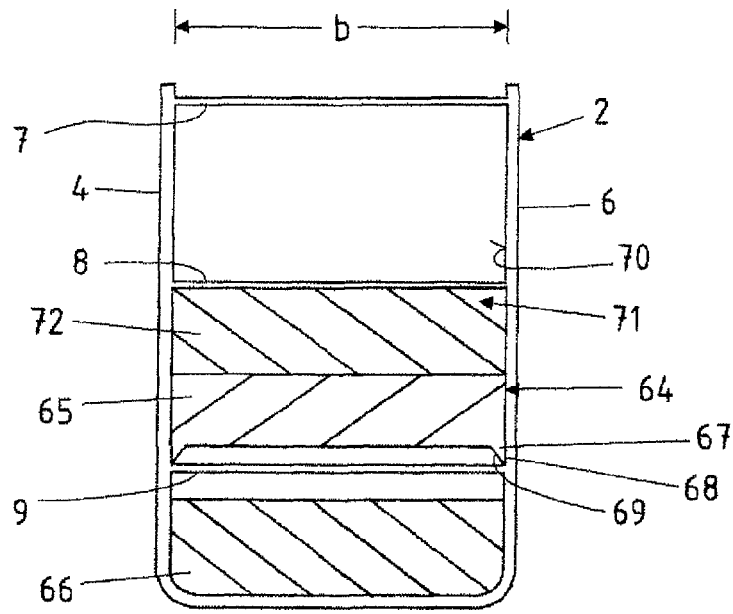
FIG. 10 a front view onto a hollow profile of an energy-absorbing profile together with a cutting tool in vertical cross section and FIG. 11 a front view onto the hollow profile of an energy-absorbing profile and an embodiment of a device for producing the energy-absorbing profile.
Figure 11:
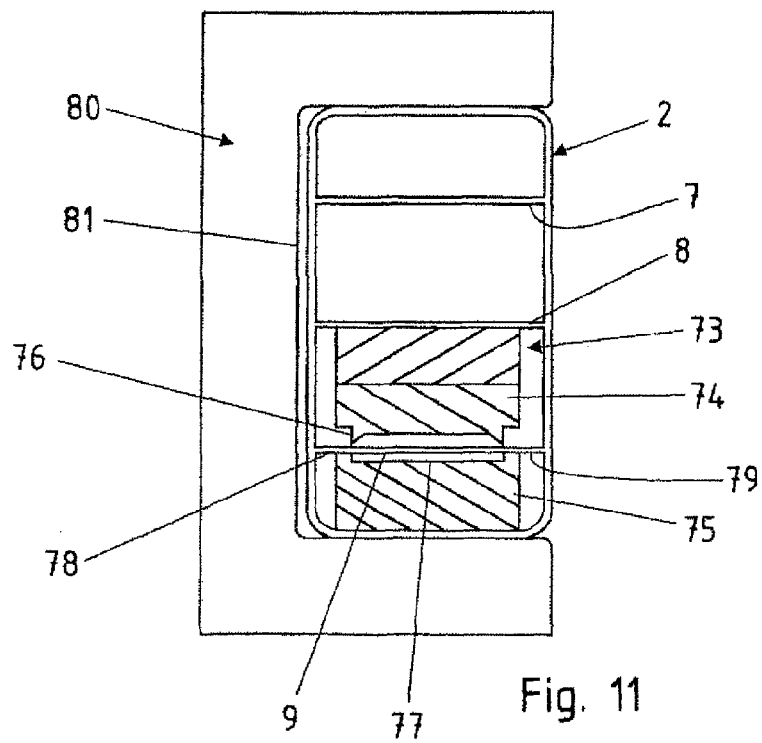

FIGS. 10 and 11 show side views onto a hollow profile 2 of an energy-absorbing profile 1 with illustration of different cutting tools.

FIG. 3 schematically shows a side view of an extruded hollow profile 2 corresponding to the configuration according to FIGS. 1 and 2 prior to the removal of inner wall sections. The hollow profile 2 shown in FIG. 3 serves as starting profile for the production of the energy-absorbing profile 1 according to the invention and is cut to size from a light metal profile strand. Subsequently a cutting tool 24 or cutting tool parts 25, 26 are inserted into the hollow profile 2 and an internal wall section 19, 20 or 27 is cut out form one or multiple of the inner walls 7, 8, 9. Subsequent thereto the cut out wall section 19, 20 or 27 and the cutting tool 24 are removed from the hollow profile.

The cutting out or separating out of the wall sections 19, 20, 27 can be carried out with a variety of devices with different cutting tools.

In the device shown in FIG. 4, a cutting tool 24 is used which includes two cutting tool parts 25, 26 which extend over the length of the hollow profile 2 so that lateral ends 28, 29 of the cutting tool parts 25, 26 protrude relative to the hollow profile 2. The upper first cutting tool 25 acts as punch die and has a blade 30. The lower second cutting tool part 26 has a female die 31, which is complementary to the blade 30 and severs at the same time as counter holder. Laterally to the blade 30 and the female die 31, support zones 32, 33 are respective provided which during the separation process come into contact with the inner wall 7, 8, 9 and support the inner wall 7, 8, 9 (in the here shown exemplary embodiment the inner wall 8) during the separation process. The cutting tool 24 is actuated by drive means 34 which are located outside the hollow profile 2 and act on the cutting tool parts 25, 26. The drive means 34 are illustrated by the arrows. By actuating the cutting tools 24 an inner wall section 27 of the inner wall 8 of the hollow profile 2 is cut out.

The device as shown in FIG. 5 includes a cutting tool 35 with an upper first cutting tool part 36 and a lower second cutting tool part 37 which interact with each other in order to remove an inner wall section 19 of the upper inner wall 7. The cutting tool 35 is actuated by drive means 38, which act inside the hollow profile 2. These are a press die 39 which acts through a through passage 40 in the upper outer wall 3 of the hollow profile upon the first cutting tool part 36 and actuates the cutting tool 35.

Also in this illustration the cutting tool parts 36, 37 are shown in the open position. During the cutting or separation process the cutting tool parts 36, 37 rest against the inner wall 7 to be processed and support the remaining regions or wall sections with support zones 41, while the central inner wall section 19 is cut out by the blade 42.

The cutting tool 43 shown in FIG. 6 includes an upper first cutting tool part 44 and a lower second cutting tool part 45. The first cutting tool part 44 and the second cutting tool part 45 have a number of wedge-shaped blades 46 (saw teeth) which are configured to mutually match each other. The movement of the cutting tool parts 44, 45 toward each other to perform the cutting lift can occur mechanically by drive means 47 located outside the hollow profile 2.

It is also possible that the blades are supported movable inside the cutting tool parts and can be actuated by appropriate drive means.

In the cutting tool 48 of the device as can be seen in FIG. 7, the actuation of the cutting tool parts 49 50 occurs by at least one drive part 51 which acts inside the hollow profile 2. The drive means 51 is formed by a hydraulically or pneumatically expandable body 52, for example a tubular body. The expansion capability of the body 52 is indicated by the arrows P. As a result of expansion of the tubular body 52, the first cutting tool part 49 is moved and the separation process effected. Hereby an inner wall section 27 of the inner wall 8 is removed.

The cutting tool 53 of the device as shown in FIG. 8 has an upper first cutting tool part 54 with an obliquely extending blade 55. The lower second cutting tool part 56 has a female die 57 with a recess 58, which has a configuration matching the one of blade 55. By closing the cutting tool 53, an inner wall section 27 of the inner wall 8 is cut out. The shearing force essentially acts in longitudinal direction L of the cutting tool 53 or the hollow profile 2.

Figure 9:
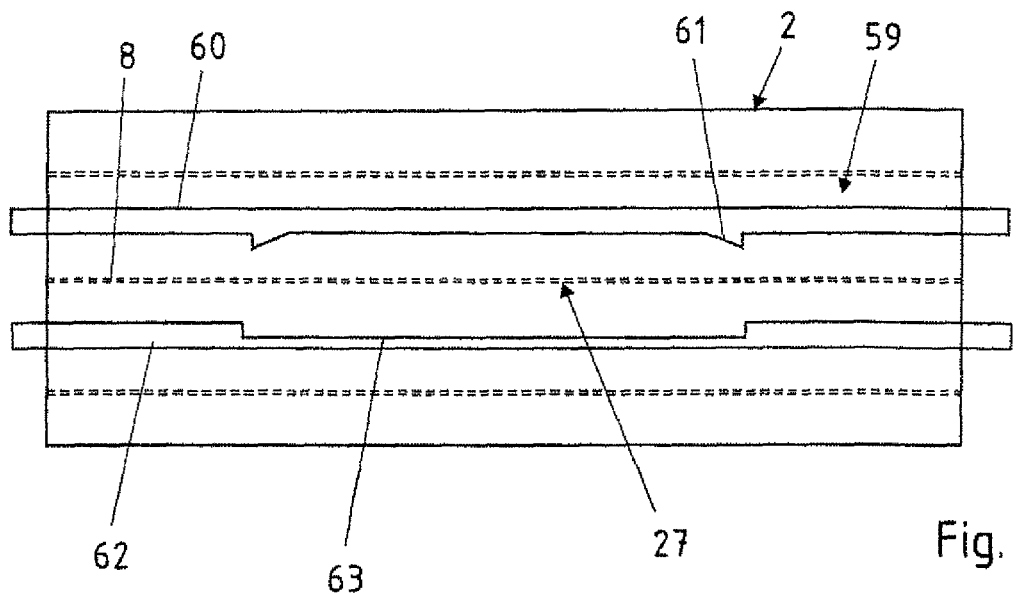
FIG. 9 the hollow profile of an energy-absorbing profile together with a further embodiment of a cutting tool.

The cutting tool 59 of the device according to FIG. 9 has at the upper first cutting tool part 60 blades 61, which are slanted on the outside vertically and inside by a wedge angle in order to cut out the inner wall section 27. The lower second cutting tool part 62 has a female die 63, which has a configuration matching the blade 61. The shearing force acts in the direction toward the cutting tool 59 or the hollow profile 2.

The device shown in FIG. 10 includes a cutting tool 64 with an upper first cutting tool part 65 and a lower second cutting tool part 66 which are introduced into the hollow profile 2 from an end side. The first cutting tool part 65 has lateral blades 67 with vertical outer surfaces 68 and an inner wedge surface 69. The cutting tool 64 has a width, which is adjusted to the inner width b of the hollow profile 2. During the separation process the inner wall section 20 of the inner wall 9 is cut out flush along the inner surfaces 70 of the outer walls 4, 6.

Above the first cutting tool part 65 a drive means 71 in the form of an expanding mandrel 72 is shown in a technically simplified manner.

The device in the embodiment according to FIG. 11 has a cutting tool 73 with an upper first cutting tool part 74 and a lower second cutting tool part 75. The first cutting tool part 74 has blades 76 which interact with a die 77 in the lower second cutting tool part 75. As can be seen the cutting tool parts 74, 75 are adapted to each other and arranged so that an inner wall section 20 of the inner wall 9 of the hollow profile 2 is cut out by actuation of the cutting tool 73, wherein lateral webs 78, 79 remain standing in the inner wall 8 during the separation process.

An outer support unit 80 of the device can also be seen. The support unit 80 has a receiving space 81 for the hollow profile 2. In the support unit 80 the hollow profile is held during the cutting process.

What is claimed is:

1. A method for producing an energy-absorbing profile for a motor vehicle comprising:

extruding a deformable energy-absorbing material, said extruded material having outer walls and at least one inner wall which connects two of the outer walls;
   inserting a cutting tool into a hollow profile;
   actuating the cutting tool and cutting 20% to 80% of an inner wall section out of the inner wall; and
   removing the cut out wall section and the cutting tool from the hollow profile.

2. The method of claim 1, wherein adjacent regions of the at least one inner wall are supported during the cutting.

3. The method of claim 1, wherein the cutting tool has a first cutting tool part and a second cutting tool part and the first cutting tool part is inserted from an end side of the hollow profile into a first chamber of the hollow profile on a first side of the inner wall and the second cutting tool part is inserted from another end side of the hollow profile into a second chamber of the hollow profile on a second side of the inner wall opposite to the first side.

4. The method of claim 1, wherein the cutting tool is actuated by drive means, which act outside of the hollow profile.

5. The method of claim 1, wherein the cutting tool is actuated by drive means, which act within the hollow profile.

6. A device constructed for carrying out the method of claim 1, said device comprising a cutting tool which extends through a length of the hollow profile, said cutting tool having blades, said blades being arranged so as to enable cutting out an inner wall section of the inner wall of the hollow profile by actuation of the cutting tool.

7. The device of claim 6, further comprising drive means for actuating the cutting tool, said drive means acting from an outside of the hollow profile and/or within the hollow profile upon the cutting tool or on the cutting tool.

8. The device of claim 6, wherein the cutting tool comprises two cutting tool parts constructed for insertion into the hollow profile in a same direction or in opposite directions.

9. The device of claim 6, further comprising an outer support unit which receives the hollow profile.

10. A device for producing an energy-absorbing profile comprising an extruded deformable energy-absorbing material for a motor vehicle with outer walls and at least one inner wall which connects two of the outer walls, said inner wall being removed in an inner wall section at least in regions, said device comprising:

a cutting tool which extends through a length of the hollow profile, said cutting tool having blades which are arranged so as to effect cutting 20% to 80% out of an inner wall section of the inner wall of a hollow profile by actuation of the cutting tool.

11. The device of claim 10, further comprising drive means for actuating the cutting tool, said drive means acting from an outside of the hollow profile and/or within the hollow profile upon the cutting tool or on the cutting tool.

12. The device of claim 10, wherein the cutting tool comprises two cutting tool parts constructed for insertion into the hollow profile in a same direction or in opposite directions.

13. The device of claim 10, further comprising an outer support unit which receives the hollow profile.

* * * * *